United States Patent [19]

Manke

[11] Patent Number: 4,535,923
[45] Date of Patent: Aug. 20, 1985

[54] AUTOMOBILE BEVERAGE HOLDING DEVICE

[76] Inventor: James E. Manke, P.O. Box 64295, West Los Angeles, Calif. 90064

[21] Appl. No.: 478,678

[22] Filed: Mar. 25, 1983

[51] Int. Cl.³ .............................................. B60R 7/00
[52] U.S. Cl. ................................. 224/273; 224/272; 224/42.45 R
[58] Field of Search .............. 224/273, 274, 278, 282, 224/311, 42.42, 42.45 R, 42.46 R

[56] References Cited

U.S. PATENT DOCUMENTS

| | | | |
|---|---|---|---|
| 1,485,102 | 2/1924 | Wells | 224/282 X |
| 2,926,879 | 3/1960 | Dietrich | 224/42.45 R X |
| 2,939,585 | 6/1960 | Burgin | 224/42.45 R X |
| 3,056,412 | 10/1962 | Wolfe | 224/273 X |
| 3,142,853 | 8/1964 | Hensley | 224/274 X |

*Primary Examiner*—Steven M. Pollard

[57] ABSTRACT

An automobile beverage holding device that is meant to be clipped onto an opened rear or front ashtray or a glove compartment door when fully opened. The apparatus is designed to provide clearance of overlapping trim in certain auto ashtray styles. The user may position the device slot assembly and cup receptable to a desired position at arms reach while seated either in the front seat or rear seat of an automobile.

7 Claims, 13 Drawing Figures

AUTOMOBILE BEVERAGE HOLDING DEVICE

BACKGROUND OF THE INVENTION

1. Field of the Invention

This invention relates to an apparatus for holding a paper cup filled with coffee or a full can of soda pop in an automobile. It is a well known fact that a driver or passenger in an automobile is somewhat restricted in movement and has little or no place to temporily hold his or her beverage container, i.e., his or her cup of coffee or can of soda pop at arms reach. The present commercially sold auto beverage holders are said to be unsatisfactory as far as the design for adjustability, stability and convenience is concerned.

This invention falls into the category of an automobile beverage holder and more particularly a holder that can be conveniently placed and firmly clipped onto a support object such as the left or right side member of an automobile rear ashtray or front dash ashtray when completely pulled open and a opened glove compartment door and such. The slot assembly and receptacle portion of this device are fully adjustable to receive and secure upright within the cup receptacle a beverage container filled with liquid and having no slippage, rocking or tilting action of the device when in use.

2. Description of the Prior Art

It is evident that the prior art has appreciated the necessity to invent a tumbler holding device used in an automobile. One such device is discribed in U.S. Pat. No. 2,926,879 to Dietrich. There is provided an apparatus called a tumbler holder which requires a mounting bracket to be permanently fastened or anchored to a support object.

This mounting bracket is intended to receive within its channels the tumbler stud head. This method is undesirable because of the mounting bracket having to be permanently installed. For an automobile it would be an eye sore and can possibly do damage to the auto dash after installation and it is also non adjustable.

U.S. Pat. No. 3,056,412 to Wolfe describes an apparatus for curing and holding tobacco pipes. The clamping mechanism of this invention if it were to be used in conjunction with a cup holding apparatus would not function adequately due to the lack of adjustability and flexibility needed to hold liquids level when clipped onto an opened ashtray or glove compartment door.

Complete adjustability of a liquid holding device for an automobile is a must due to the many differences in auto dash designs and my invention seems to fulfill that need. The highlites and advantages of my invention over the prior art should become more clearly evident as the disclosure continues on.

SUMMARY OF THE INVENTION

It is the intent of this invention to provide a means for holding level a liquid container filled with coffee or soda pop and one that could be conveniently secured by clipping onto the right or left side member of an opened automobile rear seat ashtray or a front dash ashtray or an opened glove compartment door. This invention is designed to be commercially acceptable, i,e., a device that is and must be fully adjustable, lightweight, compact with more than adequate clipping and gripping power. It is a further object of this invention to provide a design that can accomodate the many different styles of automobile dash trim that cover the front portion of the ashtray, i,e., to be able to be clipped onto a left or right side member of an ashtray and get around the many different automobile dash trims without damage of any kind and without becoming an eye sore.

BRIEF DESCRIPTION OF THE DRAWINGS

FIGS. (5(A-D) and 6(A-C) are side views of the automobile beverage holding device clipped onto the side member of an automobile opened ashtray or glove compartment suggesting some of the different adjustable positions possible.

DESCRIPTION OF THE PREFERRED EMBODIMENT(S)

The automobile beverage holding apparatus illustrated by the drawing FIGS. 1-6 is three part. The first part being the shank 1 and the spring biased clip 4. The second part being the adjustable slot assembly 2 and the third part is the receptacle portion 3 of this invention.

Figure 5A:
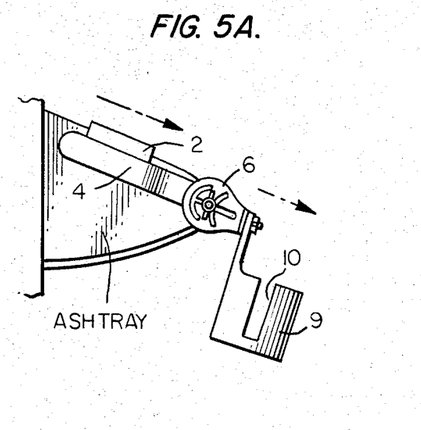
Figure 5B:
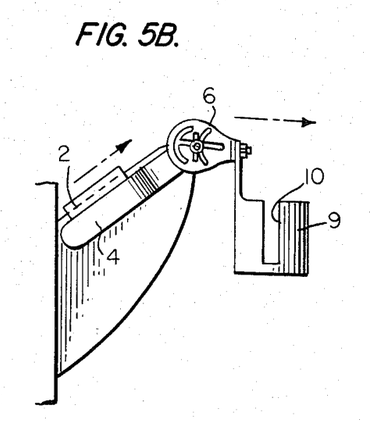
Figures 5C, 5D, 6A, 6B, 6C:
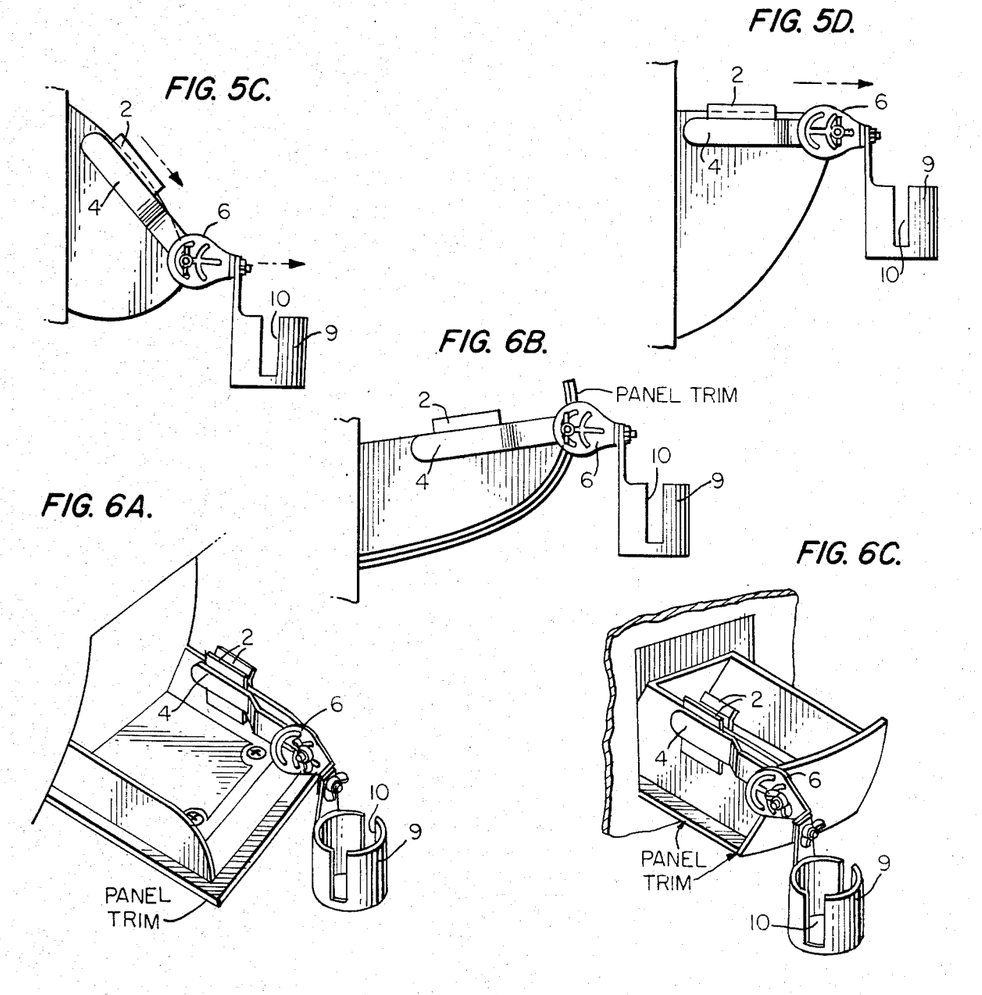

The shank 1 is designed with a 7/16" offset bend at a 45 degree angle 6 made purposely to provide clearance of the overlapping front trim 15 of certain makes of automobile ashtray when the device is secured to the side member as illustrated in FIG. 6C of the drawings.

Figure 4:
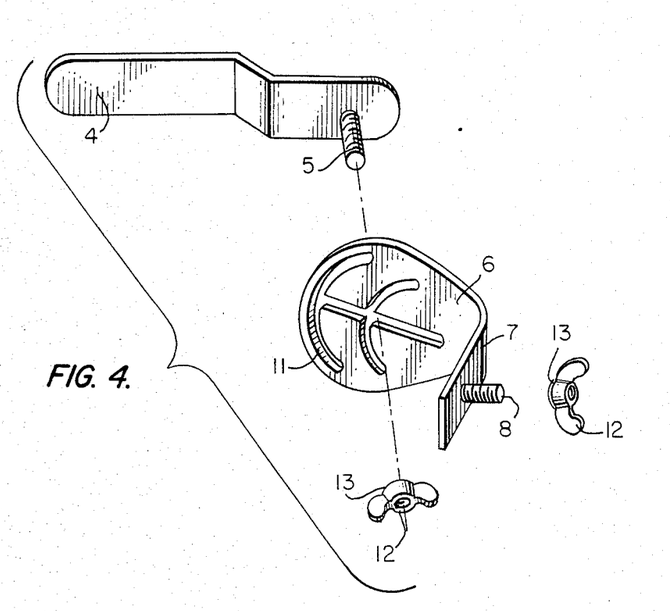
FIG. 4 is an exploded view of the automobile beverage clip holder shank and adjustable slot assembly with bolt and nut fasteners.

This 7/16" offset bend at a 45 degree angle 6 is located in the middle portion of the shank 1 and is best illustrated in FIG. 4 of the drawings.

Near one end of the shank 1 is a threaded bolt 9A that protrudes from one side of the shank 1 as illustrated in FIG. 4 of the drawings and is permanently incased or bonded to the shank 1. The bolt 9A has the purpose of receiving the adjustable slot assembly 2 and securing same in place with a nut 8A and a lock washer 8B. A wing nut may be employed and a lock washer spot welded to the nut may also be employed.

At the opposite end of the shank 1 is the spring biased clip 4. The spring biased clip 4 is integrally attached to the shank 1. The two halves of the clip 4A, 4B are mated together by a pin 18 fitted through two pivotal point hinges 14 as illustrated in drawing FIG. 3B.

Figures 3A, 3C:
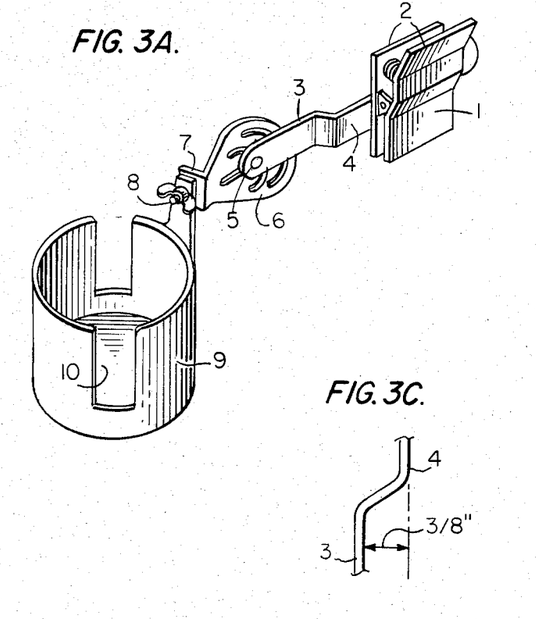
FIG. 3C is a top view of the shank offset.
Figures 3A, 3B, 3C:
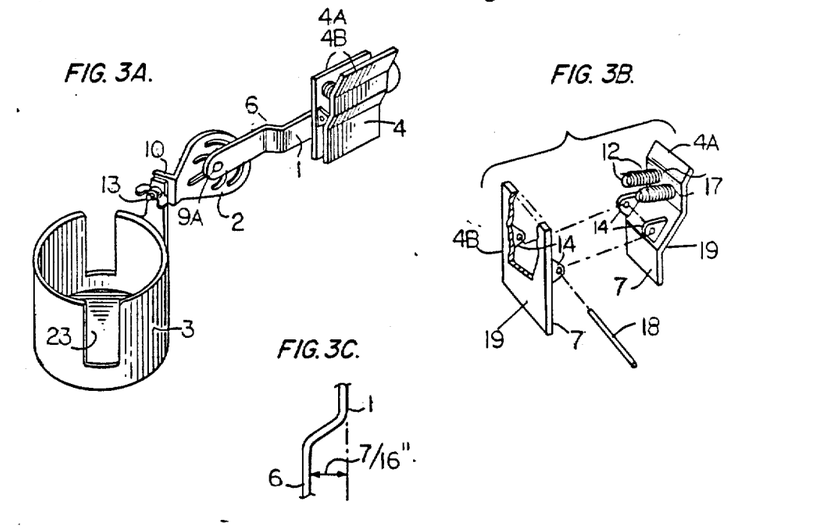
FIG. 3B is an exploded view of the clip assembly.
Figure 3B:
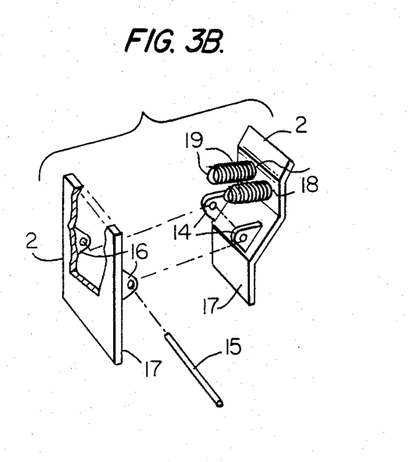

The heavy duty springs 13 are fitted in notches and are held in place with the spring action force pressed against both walls of the clip 4A, 4B. This spring action force is at the upper half of the clip walls 17 which in turn create a pinching effect at the lower part of the clip walls 19. Resilient protector portions 7 are adhered to the lower part of the clip 19 for preventing marring as well as providing additional grip to a support object, preventing slippage.

The second part of this invention is the adjustable slot assembly 2. The slot assembly includes a pair of concentric arcuate slots and a transverse slot intersecting the arcuate slots. The slot opening 5 is fitted onto the shank 1 bolt 9A and is moved through the slot assembly 2 opening 5 until a desired position is found and then it is locked in place with the wing nut 8A and lock washer 8B. The slot assembly 2 shows a right angle 10 extending portion with an integral threaded bolt 13 to same. This threaded bolt 13 is intended to receive the receptacle portion 3. This receptacle portion 3 is positioned in place and secured to the extending portion of the slot assembly with a wing nut 11A and a spot welded lock washer 11B. The receptacle portion 3 is provided with convenient openings located in opposed relationship and intended to aid in the removal of a beverage container 23 contained in the receptacle.

Although illustrative embodiments of this invention have been described in detail herein with reference to drawings, it should be understood that the invention is not limited to the precise embodiments, and that changes may be effected therein without departing from the true spirit and scope of my invention.

What is claimed is:

1. An automobile beverage holding device comprising, a spring biased clip member for securing said device to a support member such as an ash tray or glove compartment, a shank member attached at one end to said clip member and having an adjustable slot assembly at the other end thereof, and a receptacle, adjustably connected to said adjustable slot assembly, for holding a beverage container in a secure and upright orientation.

2. The automobile beverage holding device of claim 1, wherein said shank member includes an offset bend allowing clearance of auto trim members.

3. The automobile beverage holding device of claim 1, wherein said shank member includes an integral threaded bolt located at the adjustable slot assembly end of shank and received in said adjustable slot assembly and secured therein by a nut and lock washer.

4. The automobile beverage holding device of claim 1 wherein said shank member is permanently attached to said clip member and said clip member includes a resilient portion adhered thereto providing slip resistance and protection from marring.

5. The automobile beverage holding device of claim 1, wherein said adjustable slot assembly includes a pair of concentric arcuate slots and a transverse slot intersecting said arcuate slots allowing adjustment of the shank in relation to the slots.

6. The automobile beverage holding device of claim 1, wherein said adjustable slot assembly includes a portion extending at a right angle to a main slotted portion, said right angle portion including an integral threaded bolt to receive said receptacle and a nut and lock washer to secure said receptacle to said threaded bolt.

7. The automobile beverage holding device of claim 1, wherein said receptacle includes a pair of openings in opposed relationship, said openings aiding in the removal of a beverage container contained in said receptacle.

* * * * *

UNITED STATES PATENT AND TRADEMARK OFFICE
CERTIFICATE OF CORRECTION

PATENT NO. : 4,535,923

DATED : August 20, 1985

INVENTOR(S) : James Manke

Page 1 of 3

It is certified that error appears in the above-identified patent and that said Letters Patent is hereby corrected as shown below:

The title page showing the illustrative figure should be deleted to appear as per attached title page.

Figure 1:
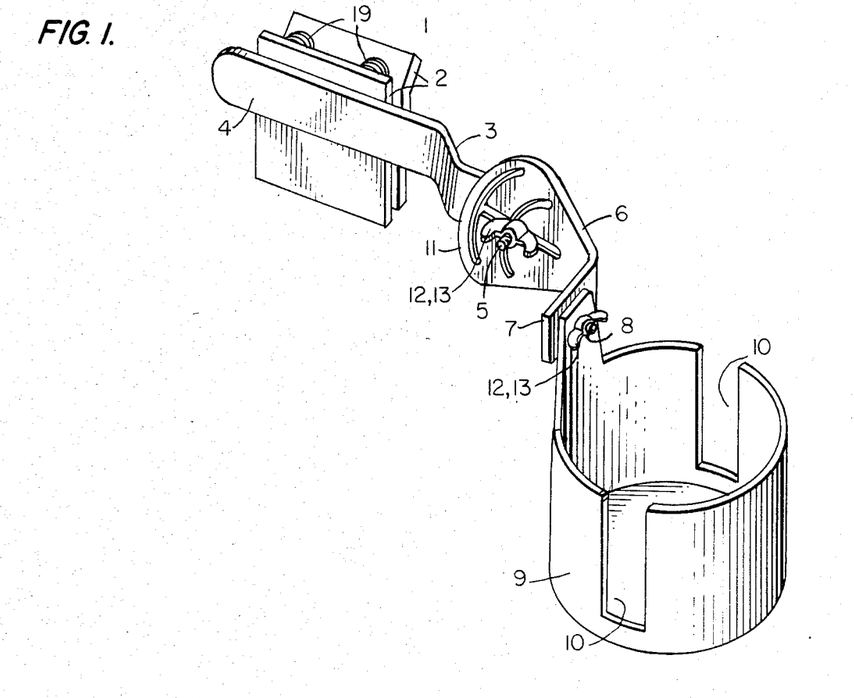
FIG. 1 is a perpective left side view of the automobile beverage holding device.

Figure 1 should read as shown on the attached sheet.

Figure 2:
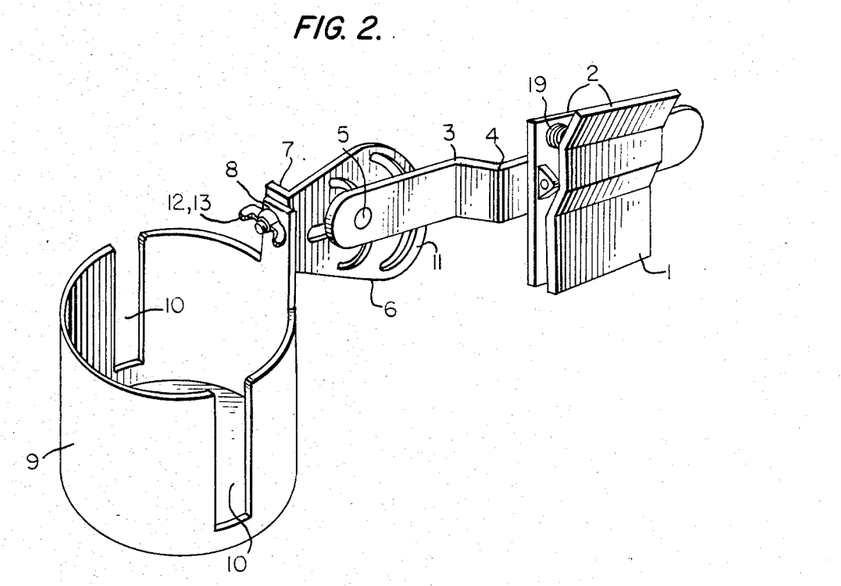
FIGS. 2 and 3A are perpective right side views of the automobile beverage holding device.

Column 2, line 6 should read:
Figure 1 is a perspective left side view of the automobile Column 2, line 8 should read:
Figures 2 and 3A are perspective right side views of the Column 2, line 50 should read:
The heavy duty springs 12 are fitted in notches and

Signed and Sealed this

Sixteenth Day of September 1986

[SEAL]

Attest:

DONALD J. QUIGG

Attesting Officer

Commissioner of Patents and Trademarks

United States Patent [19]

Manke

[11] Patent Number: 4,535,923
[45] Date of Patent: Aug. 20, 1985

[54] AUTOMOBILE BEVERAGE HOLDING DEVICE

[76] Inventor: James E. Manke, P.O. Box 64295, West Los Angeles, Calif. 90064

[21] Appl. No.: 478,678

[22] Filed: Mar. 25, 1983

[51] Int. Cl.³ .............................................. B60R 7/00
[52] U.S. Cl. ................................... 224/273; 224/272; 224/42.45 R
[58] Field of Search ............ 224/273, 274, 278, 282, 224/311, 42.42, 42.45 R, 42.46 R

[56] References Cited

U.S. PATENT DOCUMENTS

| | | | |
|---|---|---|---|
| 1,485,102 | 2/1924 | Wells | 224/282 X |
| 2,926,879 | 3/1960 | Dietrich | 224/42.45 R X |
| 2,939,585 | 6/1960 | Burgin | 224/42.45 R X |
| 3,056,412 | 10/1962 | Wolfe | 224/273 X |
| 3,142,853 | 8/1964 | Hensley | 224/274 X |

Primary Examiner—Steven M. Pollard

[57] ABSTRACT

An automobile beverage holding device that is meant to be clipped onto an opened rear or front ashtray or a glove compartment door when fully opened. The apparatus is designed to provide clearance of overlapping trim in certain auto ashtray styles. The user may position the device slot assembly and cup receptable to a desired position at arms reach while seated either in the front seat or rear seat of an automobile.

7 Claims, 13 Drawing Figures

FIG. 1.

UNITED STATES PATENT AND TRADEMARK OFFICE
CERTIFICATE OF CORRECTION

PATENT NO. : 4,535,923

DATED : August 20, 1985

INVENTOR(S) : James Manke

It is certified that error appears in the above-identified patent and that said Letters Patent is hereby corrected as shown below:

The illustrative figures # 1 thru #6C should be deleted to appear as per attached sheets showing new figures #1 thru #6C.

Signed and Sealed this

Twenty-third Day of December, 1986

*Attest:*

DONALD J. QUIGG

*Attesting Officer*     *Commissioner of Patents and Trademarks*

FIG. 1.

FIG. 2.

Patent No. 4,535,923

FIG. 5A.

ASHTRAY

PANEL TRIM 15

FIG. 6A.

PANEL TRIM 15

FIG. 6C.

PANEL TRIM 15